A. McC. BURTON.
VEHICLE BUMPER CONSTRUCTION.
APPLICATION FILED JAN. 27, 1922.

1,438,358.

Patented Dec. 12, 1922.

3 SHEETS—SHEET 1.

INVENTOR
Alexander McCord Burton
by William B. Wharton
his attorney

A. McC. BURTON.
VEHICLE BUMPER CONSTRUCTION.
APPLICATION FILED JAN. 27, 1922.

1,438,358.

Patented Dec. 12, 1922.
3 SHEETS—SHEET 2.

INVENTOR
Alexander McCord Burton
by William B. Wharton
his attorney.

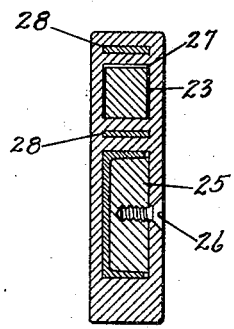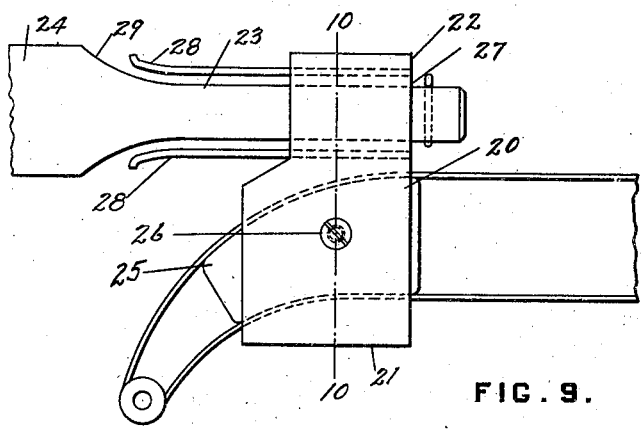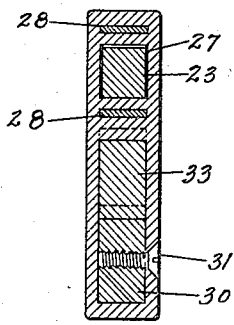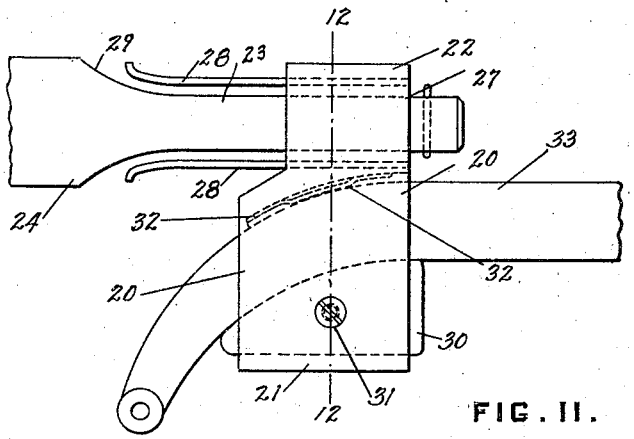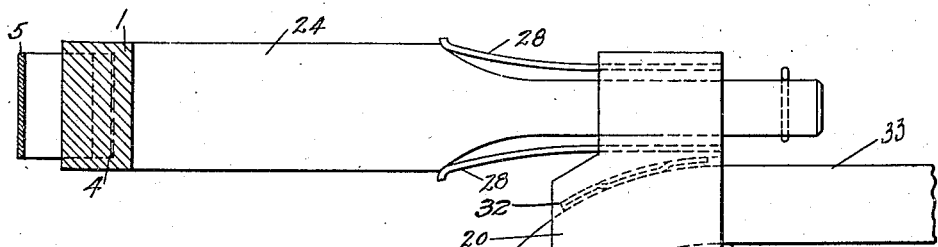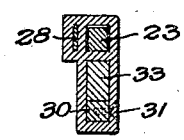

Patented Dec. 12, 1922.

1,438,358

UNITED STATES PATENT OFFICE.

ALEXANDER McCORD BURTON, OF PITTSBURGH, PENNSYLVANIA, ASSIGNOR OF FOUR-TENTHS TO HARRY W. J. SELTZER, OF PITTSBURGH, PENNSYLVANIA.

VEHICLE BUMPER CONSTRUCTION.

Application filed January 27, 1922. Serial No. 532,194.

*To all whom it may concern:*

Be it known that I, ALEXANDER McCORD BURTON, a citizen of the United States, residing at Pittsburgh, in the county of Allegheny and State of Pennsylvania, have invented a new and useful Improvement in a Vehicle Bumper Construction, of which the following is a specification.

This invention relates to an improvement in automobile bumper construction.

One object of the invention is to provide an automobile bumper, and the means for securing it to the beam horns of an automobile, so arranged that shocks experienced when the vehicle to which the bumper is attached comes into head-on collision with any object are largely absorbed by the bumper itself.

Another object of the invention is to provide means for attaching the bumper to the beam horns of an automobile which are so arranged that any shocks not wholly absorbed by the bumper itself are transmitted longitudinally along the beam horns of the automobile in such manner that there are no forces tending to twist, bend, or otherwise distort the beam horns.

A further object of the invention is to provide simple and efficient means by which a bumper may be firmly attached to the beam horns of an automobile without removing any part of the vehicle itself or its accessories in making the attachment.

Figure 1:
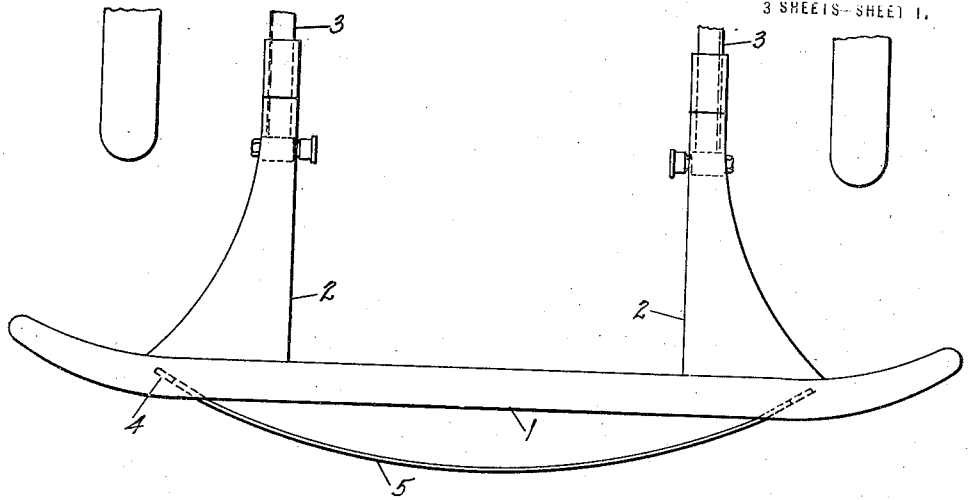
Figure 2:
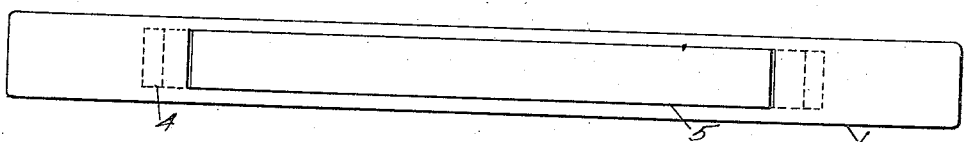
Figure 13:
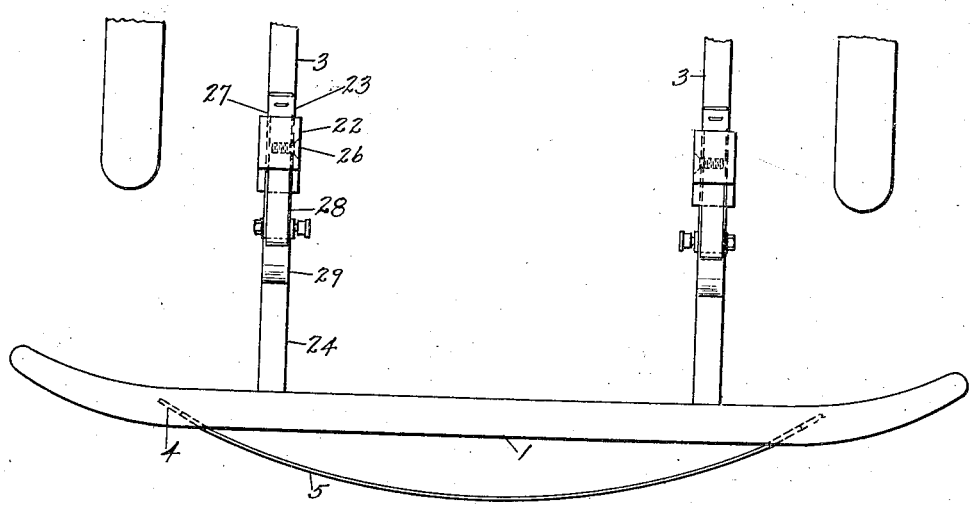
Figure 4:
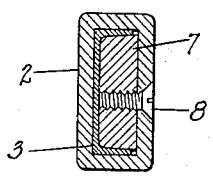
Figure 3:
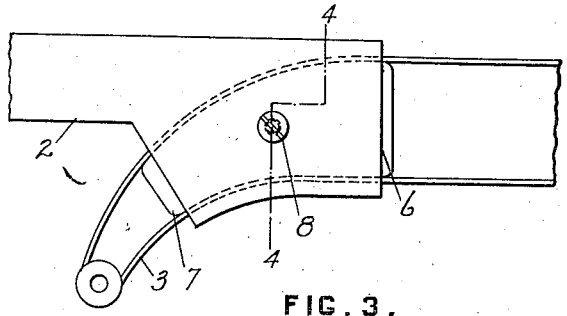
Figure 6:
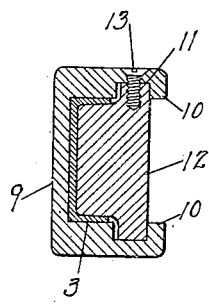
Figure 5:
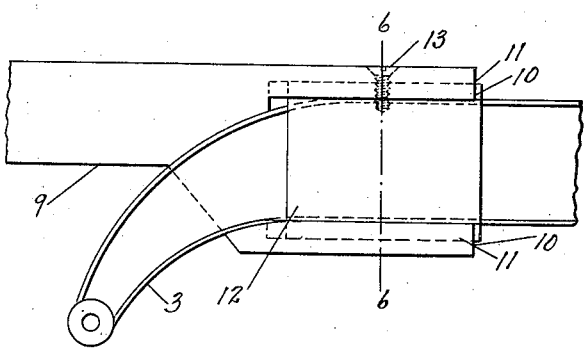
Figure 8:
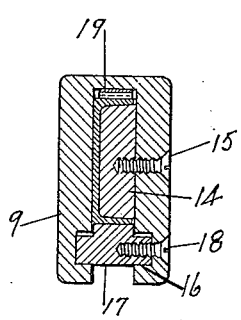
Figure 7:
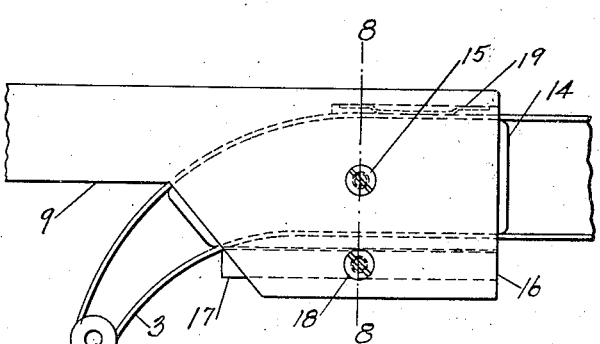

In the accompanying drawings Figure 1 is a plan view of a bumper attached to the beam horns of an automobile, and illustrating the simplest embodiment of the invention; Figure 2 is a front elevation of the bumper bar proper; Figure 3 is a detail elevation of the means for attaching the bumper shown in Figures 1 and 2 to the beam horns of the automobile; Figure 4 is a cross sectional view through the same on the line 4—4 Figure 3; Figure 5 is a detail elevation of attaching means arranged to permit attachment of the bumper to the beam horns after all the parts and accessories of the car have been assembled without removing any thereof; Figure 6 is a cross sectional view therethrough on the line 6—6 Figure 5; Figure 7 is a detail elevation showing attaching means generally similar to those shown in Figures 5 and 6 but arranged to permit the arms of the bumper to embrace the beam horns of the automobile from above instead of from the side as shown in Figures 5 and 6; Figure 8 is a cross sectional view on the line 8—8 Figure 7; Figure 9 is a detail elevation showing a special clamp arranged to secure the arms of a bumper to the beam horns of an automobile, while permitting rearward movement of the bumper arms in the clamp; Figure 10 is a cross sectional view on the line 10—10 Figure 9; Figure 11 is a detail elevation showing the attachment of the bumper arms to the beam horns by clamping means generally similar to those of Figures 9 and 10, but differing therefrom in details of construction; Figure 12 is a cross sectional view on the line 12—12 Figure 11; Figure 13 is a plan view showing a bumper in position and attached by the means shown in Figures 9 and 10; Figure 14 is a detail elevation showing the operation of the bumper and bumper attaching means of Figures 9 and 10 when the bumper comes into contact with any object; and Figure 15 is a cross sectional detail illustrating a modified cushioning means for the bumper.

The simplest form of bumper is shown in Figures 1, 2, 3, and 4 of the drawings; and is designed to be secured to the beam horns of an automobile before all the parts and accessories of the vehicle are in position. This form of bumper comprises the bumper bar proper 1 connected with which are arms 2 for attachment to the beam horns 3 of the automobile. In the forward face of the bumper bar 1 are angularly arranged slots 4 in which fit a shock absorbing spring plate 5. It will be observed that the angular arrangement of the slots 4 permits the resiliency of the spring plate 5 itself to secure it in position when its ends have been inserted in the slots. It will also be observed that the ends of the spring plate 5 do not extend to the inner extremities of the slots 4, so that upon contact with any object the spring plate 5 is permitted a limited movement in the slot as well as giving inwardly under the impact.

The attaching means, illustrated in detail in Figures 3 and 4 of the drawings are arranged to secure the arms 2 of the bumper rigidly to the beam horns 3. In this connection it should be observed that it is the standard practice to form automobile beam horns of channel members, and advantage is taken of this form for securing the bumper arms thereto. For this purpose the bumper arms 2 are provided with rearwardly opening recesses 6, tapered to correspond to the taper of the beam horns in such manner that the bumper arms may be slipped over the forward extremities of the bumper horns and can move rearwardly thereon a limited distance only. A locking member 7 is tapered and curved to lie within the channel of each beam horn, and to fit the channel and the correspondingly tapered recess or orifice in the bumper bar. It will be noticed that this filling member, or key, 7 when screwed to the arm of the bumper will prevent forward movement of the bumper on the beam horn because of its fit in the channel of the beam horn, while rearward movement is prevented solely by the fit between the beam horn and the bumper arm itself. Any simple means, such as the set screw 8 may be employed for mutually securing the bumper arm and the wedging block, and because of the fit in both directions there will be substantially no stresses under any conditions tending to shear off this set screw.

The form of attaching means illustrated in Figures 5 and 6 of the drawings is so designed that its bumper arms 9 may be slipped over the beam horns without removing the springs attached to the extremities of the beam horns. For this purpose the bumper arms 9 are formed of a general U-shape, with their openings both lying inwardly, so that they may be slipped over the beam horns and the bumper structure may be slid rearwardly thereon until the corresponding taper between the beam horn and the channeled portion of the bumper arm prevents further rearward movement. In order to prevent forward movement of the bumper structure when in position on the beam horns, each of the bumper arms is furnished with matching upper and lower flanges 10 and recesses 11 providing a seat for a filling and locking member 12. This locking member 12 is likewise curved and tapered to fit the taper and curvature of the beam horn and bumper arm, and is screwed to the bumper arm by means of a set screw or the like 13. It will be seen that this filling and locking member 12 correspond exactly in function to the locking bar 7 of the preceding figures.

The attaching means shown in detail in Figures 7 and 8 of the drawings correspond in principle to the means shown in Figures 5 and 6, but are so arranged that the bumper arms 9 may be passed over the channeled beam horns 3 instead of embracing them from the side. In this form the channel in each of the bumper arms is also tapered to fit the taper of its beam horn, and limit rearward movement of the bumper arm on the beam horn. Forward movement of the bumper structure is prevented by means of a filling and locking member 14 which may be slipped into the channel of the beam horn from the rear of the bumper arm, and secured in position by means of a set screw 15. This filling and locking member 14 is likewise tapered and curved to fit the tapered curve of the beam horn. In order to prevent vertical play between the bumper arm and the beam horn the bumper arm is provided adjacent its lower extremities with recesses 16 which receive a lower filling member 17 held in position by means of a set screw or the like 18. A spring plate 19 inserted within the bumper arm between it and the beam horn gives the necessary close engagement of the parts, and further prevents play therebetween.

The attaching means illustrated in detail in Figures 9 and 10 of the drawings, and in plan view in Figure 13 thereof, show an attachment in which a special and separate clamp is so connected with the beam horn and the bumper arm that it is rigidly secured to the beam horn and the bumper arm is slidable therein.

Each clamp 20 comprises a portion 21 arranged to be secured to the beam horn of the automobile and a portion 22 for receiving a shank 23 on the bumper arm 24. The engagement between the portion 21 of the clamp 20 and the beam horn corresponds generally to the form of attachment between the bumper arm and beam horn shown in Figures 1, 2, 3, and 4 of the drawings. The clamp, which is provided with an orifice therethrough, tapered in accordance with the tapered beam horn, is slipped over the beam horn and a filling and locking member 25 is inserted into the channel of the beam horn and secured to the clamp by means of a set screw 26. The shank 23 of the bumper arm 24 is slidable in an orifice 27 extending through the portion 22 of the clamp, so that the bumper may move rearwardly in the clamps upon any impact against the bumper. In order to limit rearward movement of the bumper and to cushion shocks thereagainst, one or more leaf springs 28 are secured to the portion 22 of the clamp and arranged to co-operate with curved surfaces 29 of the bumper bar.

The form of the device shown in Figures 11 and 12 of the drawings corresponds generally to that shown in Figures 9 and 10, but is arranged for attachment to a solid beam horn. In this form the portion 22 of the clamp 20, the springs 28, and the bumper arm 24 with its curved surfaces 29, correspond exactly to those described immediately above. The portion 21 of the clamp, however, is arranged to receive a solid beam horn, and is provided with a seat arranged to receive a wedging or locking member 30 fitting the beam horn and secured to the clamp by means of a set screw 31. The connection is rendered firm and secure by means of a spring plate 32 lying in a seat in the portion 21 of the clamp and arranged to bear against the beam horn 33.

The action of the bumper arms 24 and the cushioning springs secured to the clamps 20 is shown in Figure 14 of the drawings. While two leaf springs arranged to contact curved surfaces on the upper and lower edges of the bumper arms are shown in Figures 9 to 14 of the drawings, this arrangement is not obligatory. In Figure 15 a structure similar to that of Figure 12 is shown arranged to carry a single leaf spring. It will be also understood that two springs might be so positioned in the clamp if so desired.

It will further be understood that the structure shown in Figures 5, 6, 7, and 8 of the drawings may be combined with the structure of Figures 9 to 15 thereof, so that a clamp is provided which is arranged to permit rearward movement of the bumper arms while cushioning the same, and while permitting the clamp to be placed in position on the beam horns from either the side or top thereof, without removing the springs secured to the beam horns.

It will be seen that every form of attachment avoids the use of bolts or rivets, which would be apt to be sheared off under shocks against the bumper, and that in each case illustrated the attachment is solid and secure.

What I claim is:

1. In an automobile bumper construction a member arranged to embrace the beam horn of an automobile and having a taper to conform thereto for preventing movement of the bumper on the beam horn in one direction, and a key arranged to fit between such member and the beam horn.

2. In an automobile bumper construction a member arranged to embrace the beam horn of an automobile and having a taper to conform thereto for preventing rearward movement of said member on the beam horn, a key arranged to fit between such member and the beam horn, and resilient means arranged to resist rearward movement of the bumper.

3. In an automobile bumper construction a member arranged to embrace the beam horn of an automobile and having an engagement with the beam horn for preventing movement of the bumper on the beam horn in one direction, a key arranged to fit between such member and the beam horn, and means for securing the key to such member.

4. In an automobile bumper construction a member arranged to embrace the beam horn of an automobile and having an engagement with the beam horn for preventing rearward movement of said member on the beam horn, a key arranged to fit between such member and the beam horn, means for securing the key to such member, and resilient means arranged to resist rearward movement of the bumper.

5. In an automobile bumper construction a member arranged to embrace the beam horn of an automobile and having an engagement therewith for preventing rearward movement of the bumper thereon, and means arranged to fit between said member and the beam horn for preventing forward movement and vertical movement of said member relatively to the beam horn.

6. In automobile bumper construction a clamping member arranged to embrace and be secured to the beam horn of an automobile and to slidably receive a rearwardly extending arm of the bumper, and resilient means secured to said clamping member and arranged to cooperate with the arm of the bumper for resisting rearward movement thereof.

7. In automobile bumper construction a clamping member having an engagement with the beam horn of an automobile for preventing rearward movement of said clamping member thereon and arranged to receive a rearwardly extending arm of the bumper, and means arranged to fit between the clamping member and the beam horn for preventing forward movement of the clamping member thereon.

8. In automobile bumper construction a clamping member having an engagement with the beam horn of an automobile for preventing rearward movement of said clamping member thereon and arranged to receive a rearwardly extending arm of the bumper, means arranged to fit between the clamping member and the beam horn for preventing forward movement of the clamping member thereon, and resilient means secured to said clamping member and arranged to cooperate with the arm of the bumper for resisting rearward movement thereof.

9. In automobile bumper construction a member arranged to embrace the beam horn of an automobile and having a taper to conform thereto for preventing movement of the bumper in one direction, and a key arranged to fit between such member and the beam horn; a bumper bar mounted on said member and having angularly disposed recesses in the forward face thereof, and a resilient member arranged to engage in such angular recesses.

10. In automobile bumper construction a member arranged to embrace the beam horn of an automobile and having a taper to conform thereto for preventing rearward movement of said member on the beam horn, a key arranged to fit between such member and the beam horn, and resilient means arranged to resist rearward movement of the bumper; a bumper bar mounted on said member and having angularly disposed recesses in the forward face thereof, and a resilient member arranged to engage in such angular recesses.

11. In automobile bumper construction a bumper bar having angularly disposed recesses in the forward face thereof, and a resilient member arranged to engage therein.

12. In automobile bumper construction a bumper bar having angularly disposed recesses in the forward face thereof, and a resilient member arranged to engage in said recesses and to be held in place on the bumper bar by the tension under which it is placed by such engagement.

In witness whereof, I hereunto set my hand.

ALEXANDER McCORD BURTON.

Witnesses:
R. M. GAUGHON,
E. B. WALTERS.